W. MARTIN.
Doubletrees.
No. 143,173. Patented September 23, 1873.
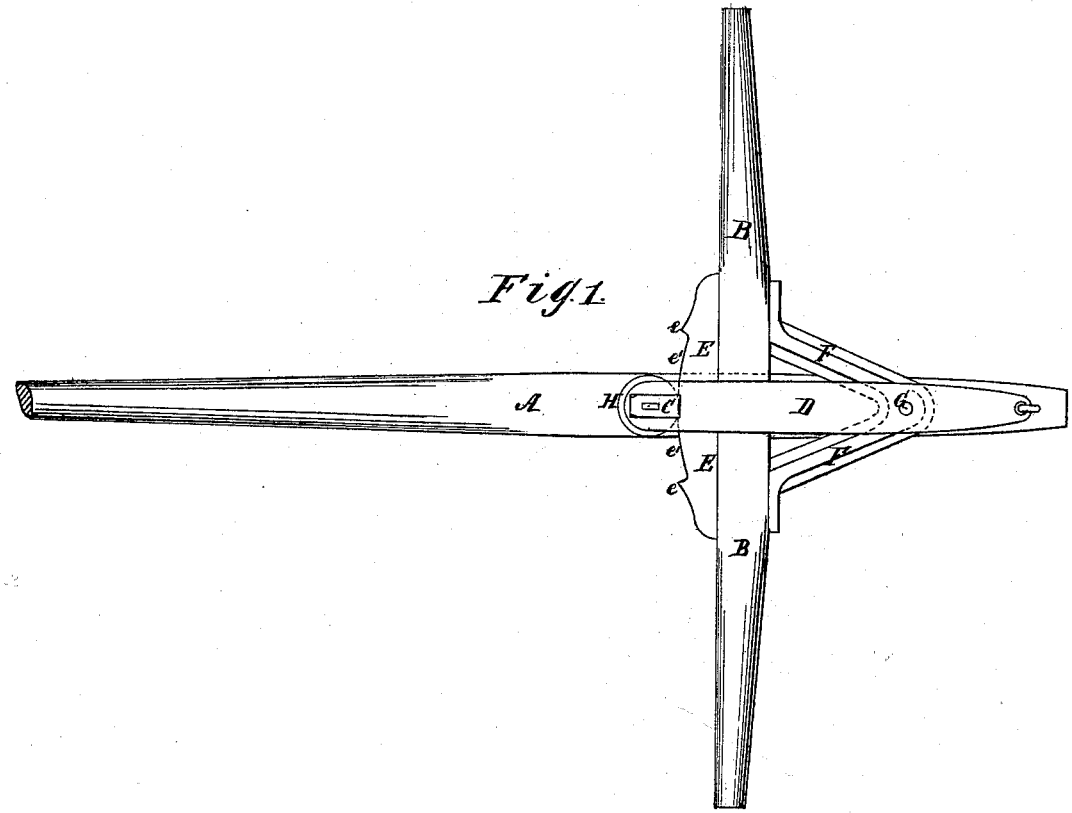
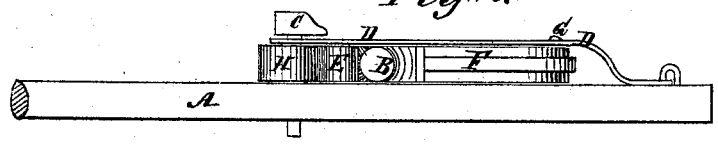
Witnesses:
G. Matthys
Solon C. Kemon
Inventor:
William Martin
Per _____
Attorneys.

UNITED STATES PATENT OFFICE.

WILLIAM MARTIN, OF CLARENCE, IOWA.

IMPROVEMENT IN DOUBLE-TREES.

Specification forming part of Letters Patent No. 143,173, dated September 23, 1873; application filed July 7, 1873.

*To all whom it may concern:*

Be it known that I, WILLIAM MARTIN, of Clarence, in the county of Cedar and State of Iowa, have invented a new and Improved Double-Tree Equalizer; and I do hereby declare the following to be a full, clear, and exact description of the same, reference being had to the accompanying drawing forming part of this specification, in which—

Figure 1 is a top view, and Fig. 2 is a side elevation.

The invention relates to double-trees that are usually pivoted to the tongue of a vehicle or the beam of a plow to allow a certain amount of vibratory movement. It consists in remedying the objectionable looseness on the beam or tongue, and the want of a proper limitation of the motion of the said double-tree, by extending rearwardly the place of the center-bolt, and placing in front a friction device, which holds the double-tree steady until a greater force is applied at one end than the other, and which, at the same time, regulates the extent of its motion, all as hereinafter described and claimed.

In the drawing, A represents the tongue of a wagon or other vehicle; B, the double-tree; C, the hammer; and D, the hammer-strap. On the front face of the double-tree is located the guard-piece E, having the projections $e\ e$ and the intermediate curved convexity $e'$. On the rear face of the double-tree is attached the angular extension F, through whose vertex, through the strap, and through the tongue, passes the pivot G, on which the double-tree turns as its center of motion. The distance from pivot G to the surface of convexity $e'$ determines the arc upon which the convexity is made. H is a friction-roll, which is placed upon the hammer-handle, and which freely rotates thereon.

The roller exercises sufficient friction to prevent the double-tree from constantly swinging out of position by its own weight, as is the case when it simply turns loosely upon a pivot, but does not prevent its turning readily when a greater force is applied on one end than on the other.

The guards $e\ e$, in connection with the roller, determine the limit of the double-tree's vibration. This is found to make a double-tree work much better, and with much more satisfaction both to driver and horse. This is an equalizer so arranged that the weaker horse can have the long arm if he gets behind. The draft is against the hammer, and the evener slides sidewise along the curved convexity, so that either horse may get behind. When both horses are up even or abreast the draft is even, and as they get out of line one gains what the other one loses in the length of lever.

Having thus described my invention, what I claim as new, and desire to secure by Letters Patent, is—

The combination, with a double-tree pivoted at the angle of a rear extension, F, and having the guard-pieces E $e\ e\ e'$, of a friction-roll, H, arranged as and for the purpose described.

WILLIAM MARTIN.

Witnesses:
T. J. GARRISON,
CHAS. A. PETTIT.